(No Model.)

H. E. KNERR.
MACHINE FOR CLEANING COTTON SEED.

No. 377,621. Patented Feb. 7, 1888.

WITNESSES

INVENTOR
Henry Edward Knerr
by Frederic Cook,
Attorney

United States Patent Office.

HENRY EDWARD KNERR, OF NEW ORLEANS, LOUISIANA.

MACHINE FOR CLEANING COTTON-SEED.

SPECIFICATION forming part of Letters Patent No. 377,621, dated February 7, 1888.

Application filed May 26, 1887. Serial No. 239,463. (No model.)

*To all whom it may concern:*

Be it known that I, HENRY EDWARD KNERR, a citizen of the United States, residing at New Orleans, in the parish of Orleans and State of Louisiana, have invented a new and useful Machine for Cleaning Cotton-Seed, of which the following is a specification.

The object of my invention is to remove the adhering cotton-lint from the cotton-seed which has not been removed by the cotton-gin, and which it is desirable to remove before going into a heater and oil-press. I attain this object by the mechanism illustrated in the accompanying drawings, in which—

Figure 1:
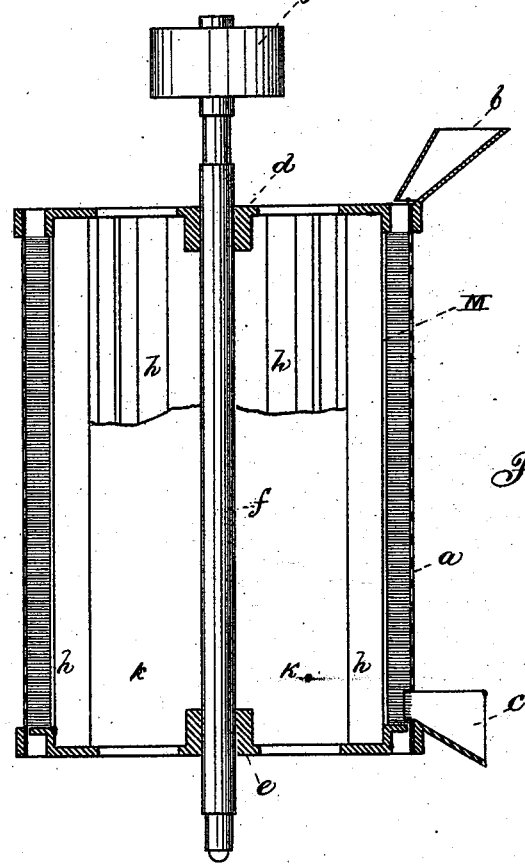
Figure 2:
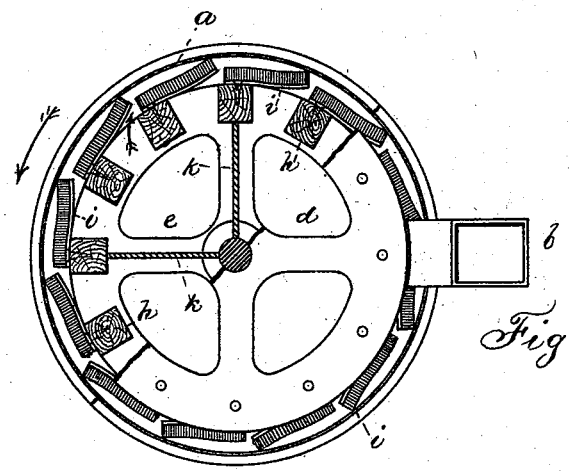

Figure 1 is a vertical section of my improved machine, a portion of the fan-blades being broken away; Fig. 2, a plan view, a portion of the casing being broken away.

Similar letters refer to similar parts in the several views.

My machine consists of a stationary casing, $a$, made either of wire-gauze or of perforated metal, with a spout, $b$, for admitting cotton-seed, and a spout, $c$, for discharging same. Inside of the casing $a$ is a revolving parallel cylinder, M, open at both ends. This cylinder is constructed as follows: Two heads, $d$ and $e$, are fastened to a shaft, $f$, which shaft has a driving-pulley, $g$. Between these heads are fastened a number of vertical bars, $h$, leaving spaces between said bars. On the outside of these pieces are a number of brushes, $i$, with flexible backs, fastened in such a manner as to close this space. One end only is fastened to $h$. The other end rests loosely on the next piece $h$. A number of wings or blades, K, are fastened between the shaft $f$ and same pieces $h$. The whole machine is mounted on a suitable frame and bearings. (Not shown on drawings.)

The operation of my machine is as follows: The open parallel cylinder M is set in rapid motion and seed dropped into $b$. The loose end of the brushes $i$ is by centrifugal force and the action of the forced air thrown against the casing $a$, the cotton-seed is dragged around with it, and by rubbing against $a$ and from the action of the brushes $i$ the seeds lose all their lint as they gradually descend and are finally discharged through spout $c$. The wings K act as fans and discharge air through the space between $h$ and $i$, which keeps the seed cool. After the seed and lint come out of spout $c$ they are separated by a current of air in the usual manner.

The cotton-seed with the lint on when it first enters the machine occupies the largest space between the fixed ends of the brushes $i$ and the perforated casing $a$. The perforations in the casing $a$ retard the forward and downward motion of the seed somewhat, so that as the seed rotates the lint begins to be removed, and as the bulk is reduced the seed works forward and downward in the angular spaces toward the points of the flexible brushes $i$, until the seed is finally cleaned of all the lint. The air being drawn in at ends of the rotating cylinder M is forced by the fanning action of the arms K outwardly against the backs of the brushes $i$, as shown by the arrows. Thus a constant spring-like pressure is maintained and the seed are thus prevented from being broken. The air-current cleans the lint off the brushes and is discharged along with the seed through opening $c$.

I do not confine myself to a parallel revolving cylinder in a parallel outside casing, as both or either may be made tapering.

What I claim, and desire to secure by Letters Patent, is—

1. The combination, in a machine for cleaning cotton-seed, of a rotary cylinder open at both ends and carrying the bars $h$ and fan-blades K, the brushes $i$, having flexible backs and secured at one end to the bars $h$, and the perforated stationary casing $a$, substantially as shown and described.

2. In combination with the stationary perforated casing $a$, the cylinder M, rotating therein and consisting of the open heads $d$ $e$, the vertical bars $h$, arranged between said heads, as shown, and the fan-blades K of the brushes $i$, having flexible backs, each of said brushes having one of its ends secured to one of the bars $h$, and its other end overlapping the adjacent bar $h$, the free ends of said brushes being thrown out against the perforated casing $a$ by centrifugal force and an air-blast, substantially in the manner shown and described.

HENRY EDWARD KNERR.

Witnesses:
JNO. J. WARD,
FREDERIC COOK.